United States Patent
Sutter (10) Patent No.: US 8,425,064 B2
(45) Date of Patent: Apr. 23, 2013

(54) ESCAPE PATH MARKING FOR AN AIRCRAFT

(75) Inventor: Wolfgang Sutter, Halstenbek (DE)

(73) Assignee: Lufthansa Technik AG, Hamburg (DE)

( * ) Notice: Subject to any disclaimer, the term of this patent is extended or adjusted under 35 U.S.C. 154(b) by 549 days.

(21) Appl. No.: 12/531,006

(22) PCT Filed: Mar. 11, 2008

(86) PCT No.: PCT/EP2008/001927
§ 371 (c)(1),
(2), (4) Date: Jan. 12, 2010

(87) PCT Pub. No.: WO2008/110343
PCT Pub. Date: Sep. 18, 2008

(65) Prior Publication Data
US 2010/0165647 A1    Jul. 1, 2010

(30) Foreign Application Priority Data
Mar. 13, 2007   (EP) .................................... 07005097

(51) Int. Cl.
*F21V 9/16*   (2006.01)
*F21S 4/00*   (2006.01)
(52) U.S. Cl.
USPC .............................. 362/84; 362/470; 362/219
(58) Field of Classification Search .................... 362/84, 362/219, 220, 224, 217.08, 217.09, 260, 362/470, 225; 340/945; 182/18; 244/118.5; 40/452
See application file for complete search history.

(56) References Cited

U.S. PATENT DOCUMENTS

| | | | |
|---|---|---|---|
| 4,208,300 A | 6/1980 | Gravisse | |
| 4,401,050 A | 8/1983 | Britt et al. | |
| 6,186,645 B1 | 2/2001 | Camarota | |
| 6,276,634 B1 | 8/2001 | Bodle | |
| 6,474,851 B1 * | 11/2002 | Baley | 362/477 |
| 6,702,453 B2 * | 3/2004 | Weedon | 362/219 |
| 2010/0149825 A1 * | 6/2010 | Sutter | 362/470 |

FOREIGN PATENT DOCUMENTS

| | | |
|---|---|---|
| EP | 0489561 A1 | 10/1992 |
| FR | 2308155 A1 | 4/1975 |
| WO | 87/02813 | 5/1987 |
| WO | 94/17766 | 8/1994 |
| WO | 96/33093 | 10/1996 |

* cited by examiner

*Primary Examiner* — Thomas Sember
(74) *Attorney, Agent, or Firm* — Vidas, Arrett & Steinkraus, P.A.

(57) ABSTRACT

Escape path marking for an aircraft having a plurality of photoluminescent elements glow in the dark and of which each has a carrier element that is provided for attaching to a subsurface, characterized in that the carrier element has connecting edges on one or both end sides, the edges having an arc-shaped progression or having at least two sections not extending perpendicular to an orientation axis of the carrier element disposed perpendicularly on a cross section in the region of the connecting edge, the orientation axes of two carrier elements disposed successively enclosing an angle with each other.

14 Claims, 6 Drawing Sheets

ESCAPE PATH MARKING FOR AN AIRCRAFT

CROSS REFERENCE TO RELATED APPLICATIONS

Not Applicable

STATEMENT REGARDING FEDERALLY SPONSORED RESEARCH

Not Applicable

BACKGROUND OF THE INVENTION

The present invention relates to an escape path marking for an aircraft.

It is known to arrange photoluminescent strips on the floor of the aircraft for escape path marking in aircraft, which is also denoted as emergency marking. Photoluminescence is occasionally also denoted as afterglow and/or phosphorescence. The safety requirements are, for example, specified in the German Industry Standard DIN 67 510. The strips are laid in a straight line in the floor and direct the passengers and crew in the event of an emergency to the doors and emergency exits. In the past, photoluminescent strips have become increasingly accepted in the design of aircraft, as said strips are fail-safe and may be operated without a power supply.

An emergency lighting system is known, for example, from WO 96/33093 A1, in which a photoluminescent strip is arranged in a transparent carrier element. The carrier element may in this case be configured in one, two or three parts. Each carrier element has an elongate, rectangular shape and may accordingly be laid at a 90° and 180° orientation to a further carrier element.

A photoluminescent reflective sheet is known from WO 94/17766 A1. It is proposed to produce elongate strips from the two-dimensional material.

A photoluminescent escape path marking is known from U.S. Pat. No. 4,401,050 which consists of elongate strips. Arrows are provided as directional indicators for the marked escape path.

Directional indicators for the escape path are known from WO 87/02813 A1 which operate by photoluminescent means which are arranged along the aisle of the aircraft as separate disconnected arrows on the floor.

A durable fluorescing layer is known from EP 0 489 561 A1 in which colour pigments are incorporated in a polymer matrix. In this case, the fluorescent material may be incorporated in a carrier, which provides the fluorescent light with different optical properties by means of additional filters.

Safety signs backed with photoluminescent material are known from FR 2 308 155 A1.

U.S. Pat. No. 4,208,300 discloses an assembly for photoluminescent material as may be used on stairways and in road traffic situations.

It may be observed nowadays that requirements are changing for designing furniture for passenger cabins. In particular, there is a trend no longer to provide rectangular furniture but furniture with curved contours. In addition to the aesthetic effect of curved furniture, for example seat benches with a curved external contour, cupboards and counters in the service area, curved furniture also has safety advantages as the passengers, for example, may become injured less easily. Furniture of increasingly complicated design in the passenger cabin also makes it necessary to be able to adapt the escape path marking thereto in a flexible manner.

BRIEF SUMMARY OF THE INVENTION

The object of the present invention is to provide an escape path marking, which may be adapted by simple means to the most varied requirements and designs in the passenger cabin of an aircraft.

The escape path marking according to the invention is provided for an aircraft and has a plurality of photoluminescent elements which glow in the dark, in order to indicate the escape path. Each of the photoluminescent elements is arranged in a carrier element which is provided for attaching to a subsurface, for example by bonding or a screw connection. The carrier element according to the invention has connecting edges at its ends, which form the boundary with the subsequent carrier element. According to the invention, the connecting edges are configured such that said connecting edges extend either in a curved manner or in at least two sections do not extend perpendicular to an orientation axis of the carrier element disposed perpendicularly on a cross section in the region of the connecting edge. With a carrier element extending in a linear manner, the orientation axis coincides with a central longitudinal axis, and with a curved carrier element the orientation axis is located in the extension of the curved central longitudinal axis. The connecting edges extend either in an arcuate manner or have a plurality of sections which do not extend perpendicular to the orientation axis. Expediently, the sections extend respectively at a different angle relative to the orientation axis.

In the connecting edges according to the invention which do not extend perpendicular to the orientation axis, two carrier elements disposed successively enclose an angle with each other which may differ by 90° and 180°. The embodiment of the carrier element according to the invention makes it possible to lay said carrier elements in arcs for an escape path marking. A curved escape path marking thus formed may particularly easily adopt the contours of the furniture in the passenger cabin. Other shapes may also be adopted by the escape path marking, so that as a whole said escape path marking may be more easily adapted to the requirements of the escape path to be marked. Relative to the known escape path markings, in which individual elements always abut one another at right angles or in a straight line, the carrier elements according to the invention make it possible to lay out an escape path marking in any curves or paths.

In a preferred embodiment, the carrier elements are configured in a linear and symmetrical manner relative to their central longitudinal axis. The carrier element which has a symmetrical connecting edge has the advantage that left and right carrier elements are indistinguishable and a carrier element may be used both for a left curved bend and also a right curved bend of the escape path marking.

In an expedient embodiment, the connecting edges of carrier elements arranged in succession abut one another in a two-dimensional manner along one section.

In one possible embodiment, the connecting edges are configured as a polygonal outline. If two connecting edges are positioned against one another in this embodiment, said connecting edges bear against one another in the region of a polygonal section in a two-dimensional manner.

In an alternative embodiment, the connecting edge in at least one section is of curved configuration. Preferably, a circular shape may be used as the curvature of the connecting edge.

In a particularly expedient embodiment, the carrier element at one end has a first connecting edge and at its second end has a second connecting edge. The first and second connecting edges preferably have a complementary shape. In this embodiment, the complementary shapes of the connecting edges are adapted to one another, particularly in order to produce a connection which has the greatest possible surface area between two adjacent carrier elements.

In a preferred embodiment, the complementary shape in the connecting edges is configured such that a positive connection is possible between the carrier elements. The positive connection anchors the carrier elements to one another and prevents said carrier elements in the assembled state from being able to be displaced relative to one another in the longitudinal direction. In particular, the positive connection may be configured such that the carrier elements may be steplessly adjusted relative to one another in their angular position.

In a particular embodiment, two adjacent carrier elements are connected to one another via a connecting piece. The connecting piece connects the carrier elements in the manner of a link chain. A particular advantage of the connected carrier elements is that said carrier elements may be more easily arranged and aligned on the subsurface by their fastening.

In a preferred embodiment, the connecting piece is configured as an elongate element which has anchoring pins at its ends. Preferably, the anchoring pins are arranged in recesses on the underside of the carrier elements. In this manner, the connecting pieces ensure the correct spacing between the carrier elements and make it possible to move and align a chain of carrier elements accordingly.

In a preferred embodiment, adapter elements are provided which respectively carry a photoluminescent element and have two connecting edges, the shapes thereof being adapted to the shape of the connecting edge of the carrier element. Carrier elements may be positioned on both sides against the adapter element at different angles. The adapter element is preferably configured with an arcuate convex design, and the carrier element has an arcuate concave design, in order to be able to align the adapter element and carrier element relative to one another in a predetermined angular range. The connection of the adapter elements makes it possible to describe particularly narrow radii when laying the carrier elements.

BRIEF DESCRIPTION OF THE SEVERAL VIEWS OF THE DRAWINGS

Preferred embodiments are described hereinafter in more detail with reference to the figures, in which.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figures 1, 2:
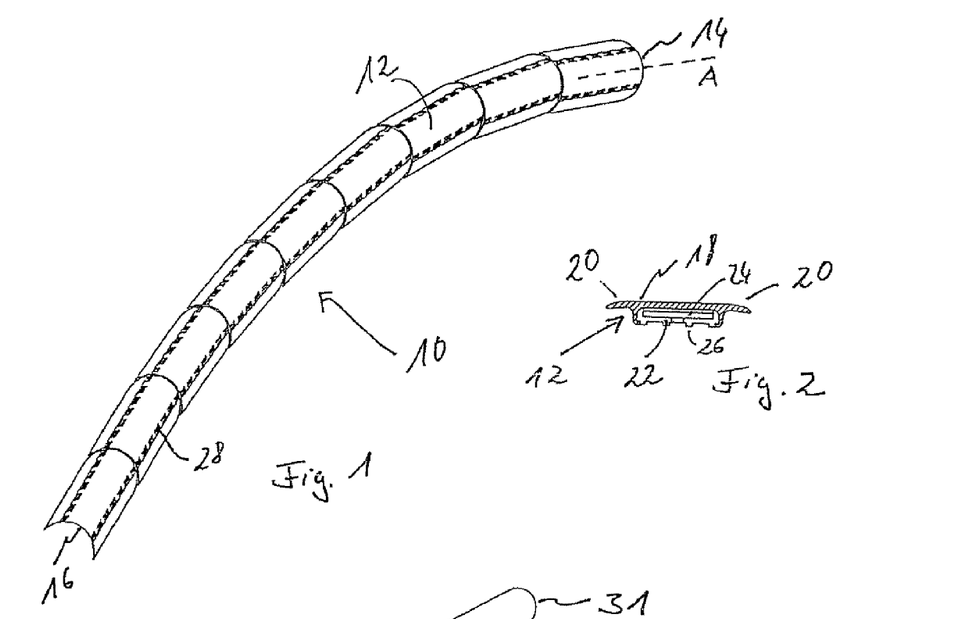
FIG. 1 shows carrier elements of an escape path marking which are arranged adjacent to one another in an arc.
FIG. 2 shows a cross section through a carrier element of FIG. 1.

FIG. 1 shows a series of carrier elements 12 which are arranged along a curved path. Each of the carrier elements 12 has an outwardly bulged convex connecting edge 14 and an inwardly bulged concave connecting edge 16. The connecting edges 14 and 16 have approximately the same curvature, so that two carrier elements 12 may be arranged in succession with the projecting connecting edge 14 in the inwardly bulged connecting edge 16. Two carrier elements may be aligned relative to one another over a symmetrical angular range, relative to their central longitudinal axis. For the carrier elements configured in a straight line, the central longitudinal axis of the carrier elements coincides with the orientation axis.

FIG. 2 shows a cross section through a carrier element 12. Clearly visible in the cross section is a cover 18 which has laterally projecting wings 20. The cover 18 is placed on a holder 22. The holder 22 has a trough-shaped structure, which receives a photoluminescent material 24. The photoluminescent material 24 is provided in the form of a strip which is inserted or bonded into the holder 22. The photoluminescent material 24 is secured via the cover 18 in the holder 22. The cover 18 serves at the same time as a protective cover for the photoluminescent material 24. The holder 22 has on its underside four projections 26 extending in the longitudinal direction of the carrier element, which facilitate the adhesion of the holder 22 to the subsurface.

The laterally projecting wings 20 of the cover 18 are spaced apart from the underside of the projections and thus from the subsurface. The wings 20 allow, therefore, a flush seal with a laterally adjoining floor covering.

The dark boundary line 28 visible in FIG. 1 illustrates the transition from the holder 22 to the wings 20. The cover and/or wings 20 are configured to be transparent in this embodiment and in the further embodiments.

Figures 3, 4:
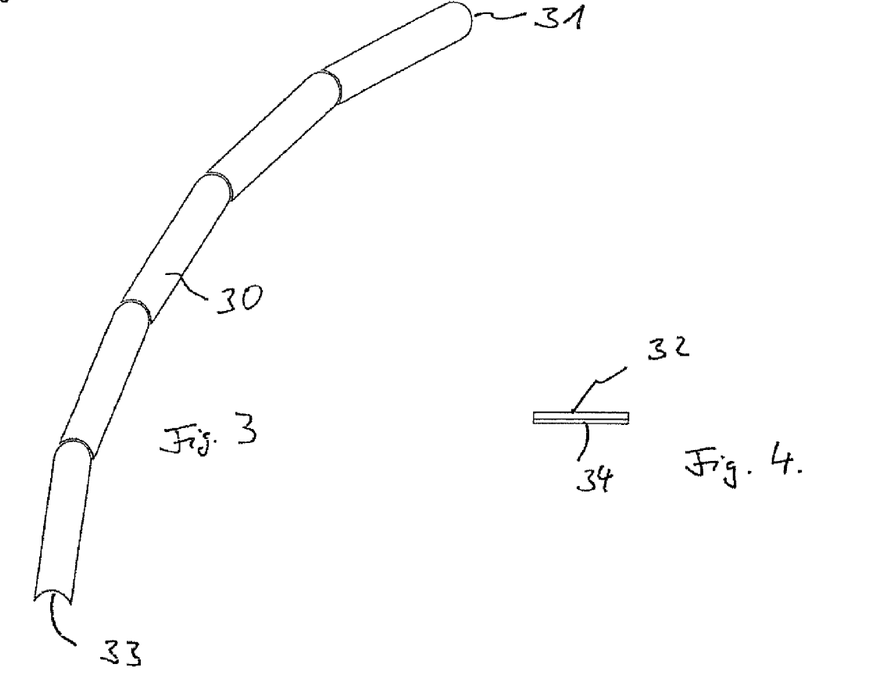
FIG. 3 shows a chain of carrier elements arranged in succession, which describe an arc.
FIG. 4 shows a cross section through one of the carrier elements.

FIG. 3 shows an embodiment in which elongate carrier elements 30 are again provided with convex and concave connecting edges 31, 33. The carrier element 30 has a structure with a planar carrier 34 on which the photoluminescent material 32 is arranged without a covering. Such an embodiment is particularly suitable for uses in which a floor covering of low height is adjoined, for example a planar plastics covering. Alternatively, the photoluminescent material may also be provided as an underlayer 34, which is applied to a transparent material 32.

Figures 5, 6, 7, 8:
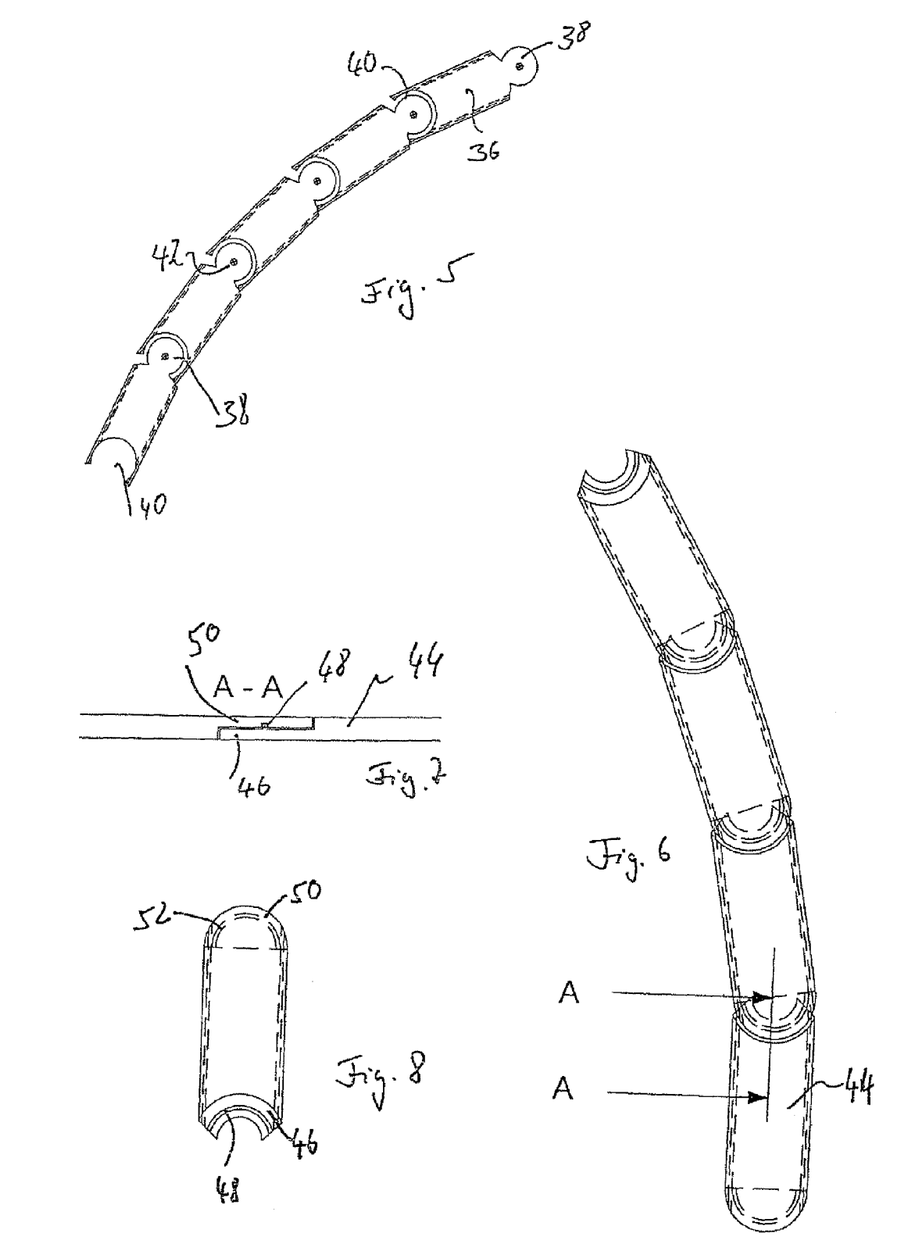
FIG. 5 shows a row of elements arranged in succession, the carrier elements having a projecting head, which is arranged in a recess of the adjacent element.
FIG. 6 shows a chain of carrier elements, which are connected at their ends via a tongue and groove connection to one another.
FIG. 7 shows a cross section through the connection of the carrier elements in the edge region.
FIG. 8 shows a carrier element in a view from below.

FIG. 5 shows an arrangement of carrier elements 36 which have an almost full circular projection 38 and at the opposing end a corresponding semi-circular recess 40. The carrier elements 36 are hooked with the projection 38 in the recess 40 of the adjoining carrier element, and may be aligned relative to one another before fastening to the subsurface.

In addition to the variant of bonding the individual elements to the floor, there is also the possibility of screwing the finished aligned chain through their projections 38 to the subsurface 42. The carrier elements which are hooked into one another may be adjusted continuously relative to one another in a predetermined angular range.

FIG. 6 shows a chain of carrier elements 44 arranged in succession, which are fastened to one another overlapping by a tongue and groove connection. As visible from the section along the line A-A in FIG. 7, a first carrier element 44 has an end section 46 located below. The end section 46 has a projection 48 which extends along a circular path on the end section 46. Overlapping with the end section 46, a second end section 50 is provided which has a circular shaped groove 52. The end section 50 overlaps the end section 46. Two adjacent carrier elements may be aligned at an angle relative to one another via the projection 48 which is arranged in the recess 52.

Figure 9:
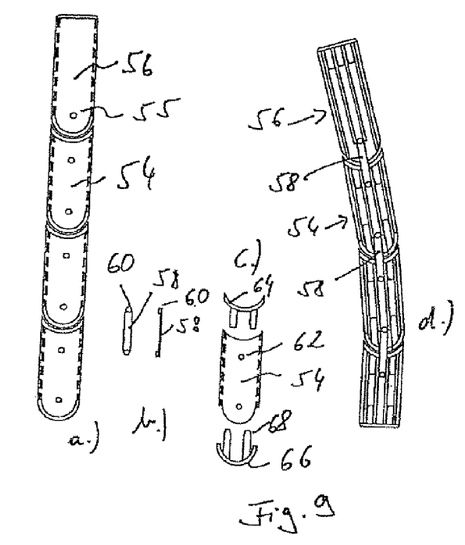
FIG. 9 shows carrier elements, which are connected to one another via connecting pieces, the ends of the carrier elements being closed via curved caps.

FIG. 9 shows carrier elements 54 which are sealed by an end piece 56. The chain shown in FIG. 9a differs in two features from the arrangements described above. The carrier elements 54 are connected to one another via connecting pieces 58. The end piece 56 is connected to a carrier element 54 on the end side. The connecting pieces 58 have an elongate shape with anchoring pins 60 at their ends. The carrier element 54 has on its underside recesses 62 which serve for receiving the anchoring pins 60. In the connected state FIG. 9d shows that two adjacent carrier elements are connected to one another via a connecting piece. As a result, the arrangement achieves the functionality of a link chain which may be flexibly aligned, without the carrier elements losing their connection to one another.

A further particularity of the carrier elements 54 is visible from FIG. 9c. The carrier element 54, which receives the photoluminescent material, is at both ends respectively closed via a curved end cap 64, 66. The end caps 64, 66 respectively have a pair of fingers 68 which hold the end caps 64, 66 on the carrier element. A particular advantage of a curved end cap is that the interior is effectively sealed and thus the pigments of the photoluminescent material are protected from oxidation, and at the same time a curved connecting edge is present which permits an alignment of the elements in succession. The end cap may have a planar base element with fastening fingers or even a recess with a peripheral end wall. Irrespective of the design, the end cap closes the carrier element.

Figure 10:
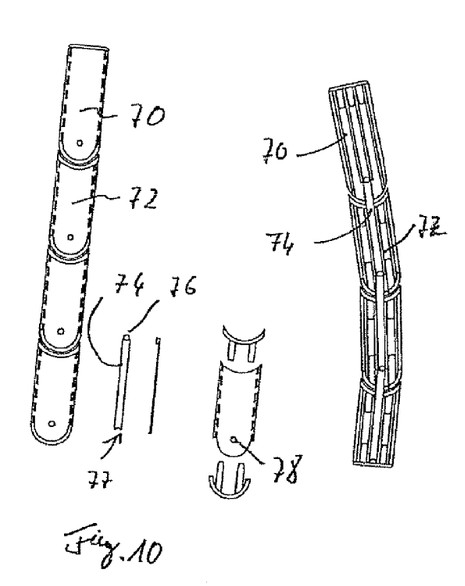
FIG. 10 shows a chain of carrier elements, which are connected to one another via connecting pieces, and have curved end caps.

FIG. 10 shows an arrangement of carrier elements 70, 72, which are aligned relative to one another via connecting pieces 74. The connecting piece 74 has at one end an anchoring pin 76 and at the other end a semi-circular recess 77. The anchoring pin 76 is anchored in a recess in the carrier element.

The semi-circular recess 77 on the end of the connecting piece 74 facing away from the anchoring pin bears in the assembled state against the anchoring pin in the next carrier element. Also, the recess 77 may be configured as a snap connection for the anchoring pin 76, so that the next carrier element is additionally held via the connecting piece.

Figure 11:
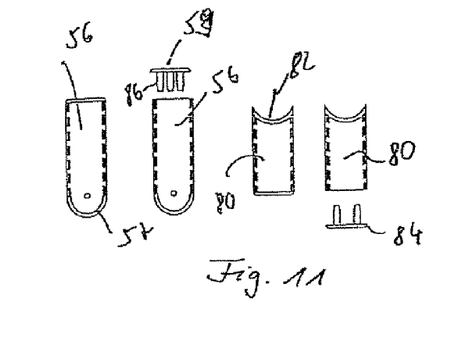
FIG. 11 shows carrier elements which are provided for the end of the chain and which have a curved end cap.

FIG. 11 shows two end pieces 56, 80 as may be used in the embodiments of FIG. 9 or 10. The end pieces 56, 80 have a bulged connecting edge 57, 82 and a straight connecting edge. The straight connecting edge is closed via a cap 59 or 84, the cap 84 having two fingers and the cap 59 having three fingers 86.

Figure 12:
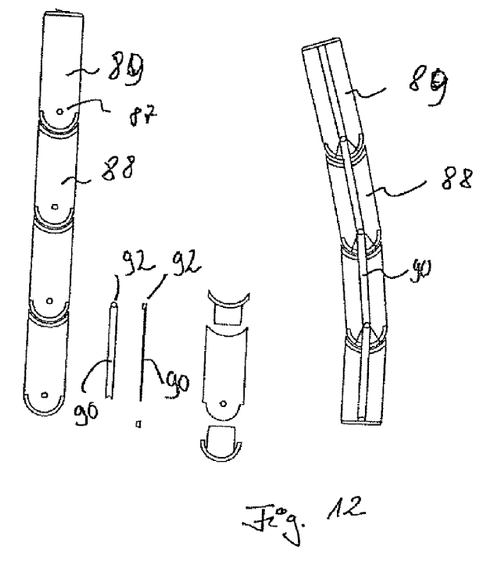
FIG. 12 shows a further embodiment of carrier elements, the carrier elements thereof having a tubular structure and being closed via curved end caps.
Figure 13:
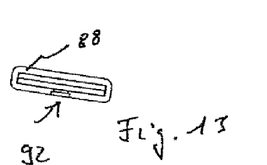
FIG. 13 shows a cross section through the tubular carrier element of FIG. 12.

FIG. 12 shows a further embodiment of carrier elements 88, 89 which are positioned relative to one another via elongate connecting pieces 90. The connecting pieces 90 have a similar construction to the connecting piece of FIG. 10. In the assembled state, the connecting pieces 90 form a continuous projection 94 which extends under the carrier element. The carrier element 88 has, as shown in FIG. 13, a closed sleeve with a recess 92 located below, into which in the assembled state the connecting piece 90 is inserted. The photoluminescent material is in this embodiment inserted into the carrier element 88 which may preferably be closed by curved end caps.

Figure 14:
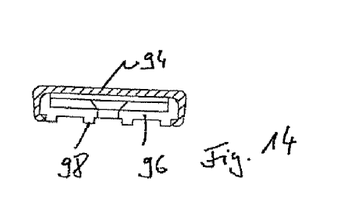
FIG. 14 shows the structure of a carrier element, which is closed via an end cap, and has bores as well as countersunk portions for a screw connection with the subsurface.

FIG. 14 shows an alternative embodiment of the carrier element in cross section, in which a cover 94 is arranged on a holder 96. The cover 94 grips the holder 96 from behind which may be fastened to the floor via projections 98 which extend in the longitudinal direction of the holder 96. The photoluminescent material is arranged between the cover 94 and the holder 96.

Figure 15:
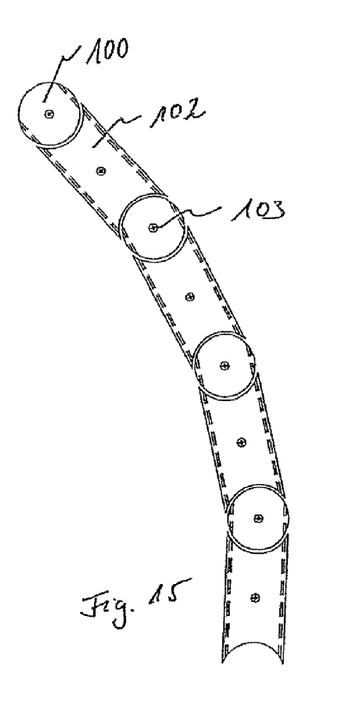
FIG. 15 shows an arrangement of elements with adapter elements arranged therebetween.

The arrangement shown in FIG. 15 of the carrier elements has adapter elements 100, which are respectively arranged between two carrier elements 102. The carrier elements 102 have an elongate shape, whilst the adapter elements 100 have an oval or almost round shape. Due to the short length of the adapter elements 100 and possibly also of the carrier elements 102 and the bonding surface which is therefore small, it is preferred to fasten the adapter and/or carrier elements to the subsurface with screws 103, in order to achieve a sufficiently fixed connection.

Figures 16, 17:
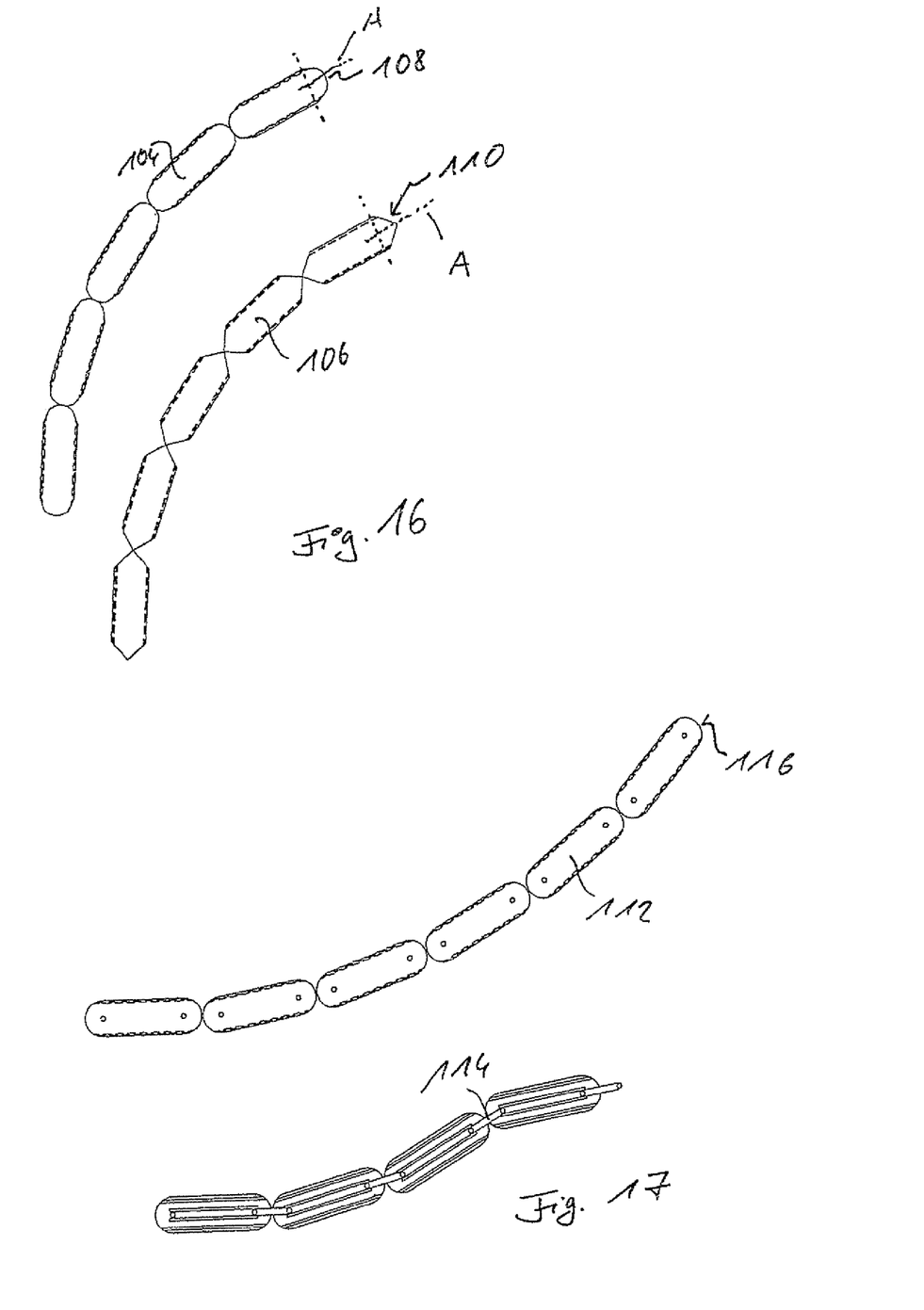
FIG. 16 shows a chain of elements which have either rounded connecting edges or pointed connecting edges.
FIG. 17 shows an arrangement of elements in a view from the upper face and from the lower face, which are connected to one another via connecting pieces.

FIG. 16 shows two further embodiments with carrier elements 104 and 106. The carrier element 104 has semi-circular connecting edges 108. The carrier element 106 has at both ends a pointed connecting edge 110. If, relative to the carrier elements 104 and 106, the cross section of the carrier element is observed just in front of the connecting edge, the connecting edges are not located perpendicular to an orientation axis A, which in turn is perpendicular to the cross section. The orientation axis A is illustrated in FIG. 16 as well as in FIG. 1.

FIG. 17 shows a further embodiment with carrier elements 112, which are connected to one another via connecting pieces 114 at their ends. The connecting pieces 114 have two anchoring pins which are arranged respectively in recesses (not shown) in the carrier elements. By means of the rounded connecting edge 116, the carrier elements 112 may be continuously adjusted relative to one another.

Figure 18:
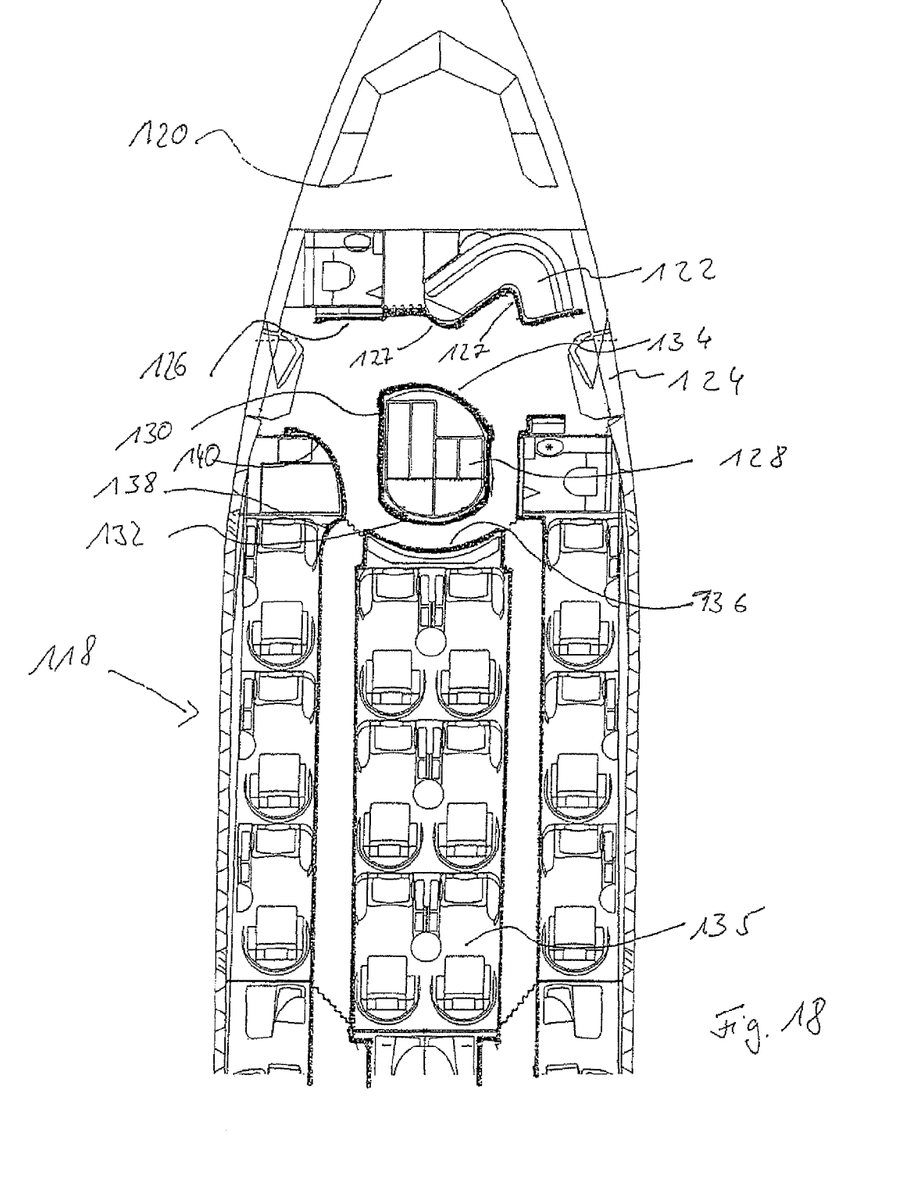
FIG. 18 shows a schematic plan view of a front section of an aircraft passenger cabin.

In FIG. 18, in the region between the passenger cabin 118 and the cockpit 120, is a row of furniture and built-in components 122. The furniture and built-in components 122 are again arranged in front of the exit doors 124 which are also provided for the emergency exits. The front edge of the furniture and built-in components 122 is characterised by an escape path marking 126. The escape path marking 126 has a row of straight sections, which alternate with curved sections 127 adapted to the contour of the furniture.

A central cupboard element 128 in the passenger cabin is also characterised by an escape path marking 130 extending in a curved manner. In the longitudinal direction of the aircraft the escape path marking 130 has two straight sections. The front and rear faces 132, 134 have a curved escape path marking. In this connection, the escape path marking 132 facing towards the passenger cabin has an approximately constant radius of curvature, whilst the escape path marking 134 facing towards the cockpit 120 does not have a constant radius of curvature.

Also, the front end 136 of the central row 135 has a curved escape path marking. On the side rows, curved sections of the escape path marking, for example at the transition from the seat row to a boundary element, may also be present. In this case, escape path markings 138 and 140 which are curved in opposite directions may be arranged directly in succession.

From the example shown in FIG. 18, it is particularly clear that substantially straight elements are additionally used in the escape path marking in order to provide the passengers with a rapid and clear orientation in the event of an emergency. The straight escape path markings according to the invention are supplemented by the curved sections of the escape path marking, such as for example 134, 132, 138 and 140, in order to ensure even in the event of an emergency a clear orientation past objects and obstructions, such as for example the cupboard 128.

This completes the description of the preferred and alternate embodiments of the invention. Those skilled in the art may recognize other equivalents to the specific embodiment described herein which equivalents are intended to be encompassed by the claims attached hereto.

The invention claimed is:

1. Escape path marking for an aircraft having a plurality of photoluminescent elements (12; 30; 36; 44; 88; 84; 102; 100; 54; 56; 7-; 72; 56; 80; 104; 106; 112-89) that are not connected to electrical power and which glow in the dark without electrical power and of which each has a carrier element that is provided for attaching to a subsurface in aircraft flooring, characterized in that the carrier element has connecting edges (14; 16; 31; 33; 38; 40; 46; 50; 108; 110) on one or both end sides, the edges having an arc-shaped progression or having at least two sections not extending perpendicular to an orientation axis (A) of the carrier element disposed perpendicularly on a cross section in a region of the connecting edge, the orientation axis (A) of two carrier elements disposed successively enclosing an angle with each other.

2. Escape path marking according to claim 1, characterized in that the carrier element is configured in a symmetrical manner to the orientation axis (A).

3. Escape path marking according to claim 1, characterized in that the connecting edges of carrier elements arranged in succession abut one another along one section.

4. Escape path marking according to claim 1, characterized in that the connecting edge in at least one section has a curvature.

5. Escape path marking according to claim 4, characterized in that the connecting edge has a circular shape.

6. Escape path marking according to claim 1, characterized in that the carrier element at one end has a first connecting edge and at a second end has a second connecting edge, the first and second connecting edges having a complementary shape.

7. Escape path marking according to claim 6, characterized in that the complementary shape of the connecting edge allows a positive connection.

8. Escape path marking according to claim 1, characterized in that at least one connecting piece (58, 74) is provided via which two adjacent carrier elements (54, 56, 70, 72) may be connected to one another.

9. Escape path marking for an aircraft having a plurality of photoluminescent elements (12; 30; 36; 44; 88; 84; 102; 100; 54; 56; 7-; 72; 56; 80; 104; 106; 112-89) which glow in the dark without electrical power and of which each has a carrier element that is provided for attaching to a subsurface in aircraft flooring, characterized in that the carrier element has connecting edges (14; 16; 31; 33; 38; 40; 46; 50; 108; 110) on one or both end sides, the edges having an arc-shaped progression or having at least two sections not extending perpendicular to an orientation axis (A) of the carrier element disposed perpendicularly on a cross section in a region of the connecting edge, the orientation axis (A) of two carrier elements disposed successively enclosing an angle with each other, characterized in that the connecting edges are configured as a polygonal outline.

10. Escape path marking according to claim 9 characterized in that the carrier element has end caps, the shape thereof being configured to correspond to the connecting edges of the carrier element.

11. Escape path marking for an aircraft having a plurality of photoluminescent elements (12; 30; 36; 44; 88; 84; 102; 100; 54; 56; 7-; 72; 56; 80; 104; 106; 112-89) which glow in the dark without electrical power and of which each has a carrier element that is provided for attaching to a subsurface in aircraft flooring, characterized in that the carrier element has connecting edges (14; 16; 31; 33; 38; 40; 46; 50; 108; 110) on one or both end sides, the edges having an arc-shaped progression or having at least two sections not extending perpendicular to an orientation axis (A) of the carrier element disposed perpendicularly on a cross section in a region of the connecting edge, the orientation axis (A) of two carrier elements disposed successively enclosing an angle with each other, characterized in that at least one connecting piece (58, 74) is provided via which two adjacent carrier elements (54, 56, 70, 72) may be connected to one another, further characterized in that the connecting piece (58, 74) is configured as an elongate element (58) which has anchoring pins (60) at its ends.

12. Escape path marking according to claim 11, characterized in that said carrier element has an underside and said underside of the carrier element (54, 88) has at least one recess (55, 87) for an anchoring pin.

13. Escape path marking for an aircraft having a plurality of photoluminescent elements (12; 30; 36; 44; 88; 84; 102; 100; 54; 56; 7-; 72; 56; 80; 104; 106; 112-89) that are not connected to electrical power and which glow in the dark without electrical power and of which each has a carrier element that is provided for attaching to a subsurface in aircraft flooring, characterized in that the carrier element has connecting edges (14; 16; 31; 33; 38; 40; 46; 50; 108; 110) on one or both end sides, the edges having an arc-shaped progression or having at least two sections not extending perpendicular to an orientation axis (A) of the carrier element disposed perpendicularly on a cross section in a region of the connecting edge, the orientation axis (A) of two carrier elements disposed successively enclosing an angle with each other, characterized in that at least one adapter element (100) is provided which respectively carries a photoluminescent element and has two connecting edges, said connecting edges of said adapter element having a shape being adapted to the connecting edge of the carrier elements (102) such that the carrier element (102) may be positioned against the adapter element at different angles.

14. Escape path marking according to claim 13, characterized in that the adapter element (100) has an arcuate convex connecting edge and the carrier element (102) has an arcuate concave connecting edge, such that the adapter element (100) and carrier element (102) may be aligned relative to one another in a predetermined angular range.

\* \* \* \* \*